United States Patent [19]

Mack et al.

[11] Patent Number: 5,141,221
[45] Date of Patent: Aug. 25, 1992

[54] DECELERATION DEVICE IN THE FOLDER OF A ROTARY PRINTING MACHINE

[75] Inventors: Richard B. Mack, York Beach, Me.; Roger R. Belanger, Dover, N.H.

[73] Assignee: Heidelberg Harris GmbH, Dover, N.H.

[21] Appl. No.: 609,200

[22] Filed: Nov. 5, 1990

[51] Int. Cl.⁵ .............................................. B65H 5/34
[52] U.S. Cl. .................................... 271/270; 271/277; 271/203; 271/314
[58] Field of Search ............... 271/203, 202, 182, 277, 271/275, 270, 72, 314, 216, 315

[56] References Cited

U.S. PATENT DOCUMENTS 4,629,175 12/1986 Fischer et al. ...................... 271/202
4,993,702 2/1991 Jackson ........................... 271/202 X

FOREIGN PATENT DOCUMENTS 255834 9/1926 United Kingdom ................ 271/182

Primary Examiner—David H. Bollinger
Attorney, Agent, or Firm—Tarolli, Sundheim & Covell

[57] ABSTRACT

The invention relates to a deceleration device for folded products, with which folded products following one behind the other are gripped by decelerable transport devices (6, 7) and conveyed. The oppositely arranged transport devices (6, 7) tracing a path of motion (15) are driven by a planetary gearing (16). While planetary gears (21, 22) rotate around a sun gear (23), an instantaneous centre P1 describe a cardioid which, via drive brackets (17, 18 and respectively 55) causes the transport devices (6, 7) to take different speeds during rotation of the planetary gears (21, 22).

6 Claims, 4 Drawing Sheets

DECELERATION DEVICE IN THE FOLDER OF A ROTARY PRINTING MACHINE

FIELD OF THE INVENTION

The present invention relates to a deceleration device in the folder of a rotary printing machine.

BACKGROUND OF THE INVENTION

German Patent 34 04 459 discloses a method and a device for delivering sheet products in an overlapping manner. Non-overlappingly conveyed products are decelerated in an overlapping unit where they are arranged so as to overlap, and from where they are conveyed and delivered onto a conveyor belt in an overlapping manner. Grippers are respectively decelerated and accelerated with respect to a drum rotating together with the grippers. The grippers move in slots provided in the outer wall of the drum. A folded product is gripped at its leading edge by nine gripper bars which are radially arranged and mounted in two respective rocking arms. During deceleration of the gripper bars the contact between the entire underside of the folded product resting on the drum and the outer wall of the drum rotating at constant speed causes a disadvantageous full-area relative motion between the underside of the folded product and the outer wall of the drum, thus leaving undesired abrasive marks and scratches on the folded product.

A further disadvantage of the device disclosed in the German patent is the fact that each of the nine radially arranged rocking arm pairs is driven separately. This results in an upper speed limit. Moreover, the device requires much space in the folder.

Furthermore, the device disclosed in the German patent can only be used in large cylinders in order t be able to accommodate a sufficient number of gripper systems, which requires much space. An additional major disadvantage of the device is the fact that it is not suitable for high frequencies. The guides in which the axial projections of the gear ring move quickly up and down with each rotation are subject to a high degree of stress, and thus to a high degree of wear and tear. Inaccuracies resulting from the increasing play between the axial projections and the limitations of the guides affect the precision of the delivery.

SUMMARY OF THE INVENTION

The disadvantages of the state of the art are eliminated by the present invention.

It is an object of the invention to optimize a device for decelerating folded products in a folder such that a continuous deceleration of the folded products ca be realized, ensuring a high reliability of operation given a compact setup.

According to the invention, a deceleration device includes oppositely arranged transport devices which are driven in a revolving path of motion by planetary gearing. During rotation of the planetary gears around a sun gear, an instantaneous center P1 traces a cardioid which, via drive brackets, causes the revolving transport devices to take different speeds during the rotation of the planetary gears.

The advantages of the invention are to be seen in a safe transport of the folded products into the product delivery. The transport devices permit a trouble-free transport of multi-page folded products at high speeds due to the fact that a rotary system of motion which does not perform any linear motion is involved. By continuously decelerating the folded products on a deceleration path a buckleless and gentle product delivery is achieved.

The deceleration device for folded products has a wide range of use. Due to its compact setup it may be disposed before a fan delivery or before a delivery belt rotating at a lower speed, thus producing an overlapping stream of folded products. The device may also be used for the stack delivery of folded products. The use of planetary gearing is deal at high speeds, as the forces of inertia can be kept small at high and very high rotational speeds.

In a preferred embodiment of the invention, planetary gears are mounted on stub shafts in a drive gear which is driven by a drive pinion. The planetary gears rotate around a sun gear mounted on an axle which is rigidly mounted in a side wall. A pair of gripper bars for gripping the folded products are carried on opposite ends of a drive bracket. The drive bracket is connected to the planetary gars by pins so as to rotate when the planetary gears revolve around the sun gear. A point on the drive bracket traces a cardioid as the drive bracket rotates. The ends of the drive bracket thus experience both translational and rotational movements. The gripper bars at the ends of the drive bracket therefore have differing rotational speeds as the gripper bars rotate.

Advantageous with this embodiment is the reliable transport of folded products by means of the gripper bars, and the low forces of inertia at high rotational speeds, as compared to the state of the art. Moreover, there is only one rotary motion which is not superimposed by another kind of motion.

In another advantageous embodiment of the invention planetary gears are mounted on stub shafts in a drive gear which is mounted eccentrically with respect to the axis of a cantilevered shaft, and which is driven by a drive pinion. The planetary gears rotate about a sun gear mounted on an axle which is stationarily mounted in a housing. The planetary gears rotate a drive bracket via pivot-mounted levers and pins. The drive bracket in turn drives, via pins with guides, guiding rods which can be moved in sleeves. The guiding rods are connected to support segments which are rotatably mounted on a cantilevered shaft. The support segments comprise gripper rods with fingers that are actuated by control cams to grip the products being conveyed in the printing press.

The advantages the latter embodiment are to be seen in small forces of inertia due to the light gripper system, and in a circular gripper motion. In this embodiment the translational motion is minimal as it is only a compensating motion. As the gripper angle remains constant during each revolution, the folded products are not bent or otherwise mechanically damaged.

In an advantageous embodiment of the invention the transport devices open, via control cams, early enough for the air resistance to decelerate the folded products additionally when being delivered onto a pile, thus achieving a smooth delivery of folded products without creases or buckles in the products. The advantage of this embodiment is that, in the case of a stack delivery, the opening up of multi-page folded products caused by the air resistance is used to further decelerate the folded products.

Furthermore, the deceleration device can be arranged before a fan delivery, or it can be used to deliver an overlapping stream of folded products onto a delivery belt.

The advantage is to be seen in the wide range of application of the deceleration device for folded products which requires only little space.

Finally, the deceleration device can be used so that the folded products can be taken from a belt or another gripper cylinder, and so that a first deceleration of 30 percent at most is attained.

DESCRIPTION OF PREFERRED EMBODIMENTS

Figure 1:
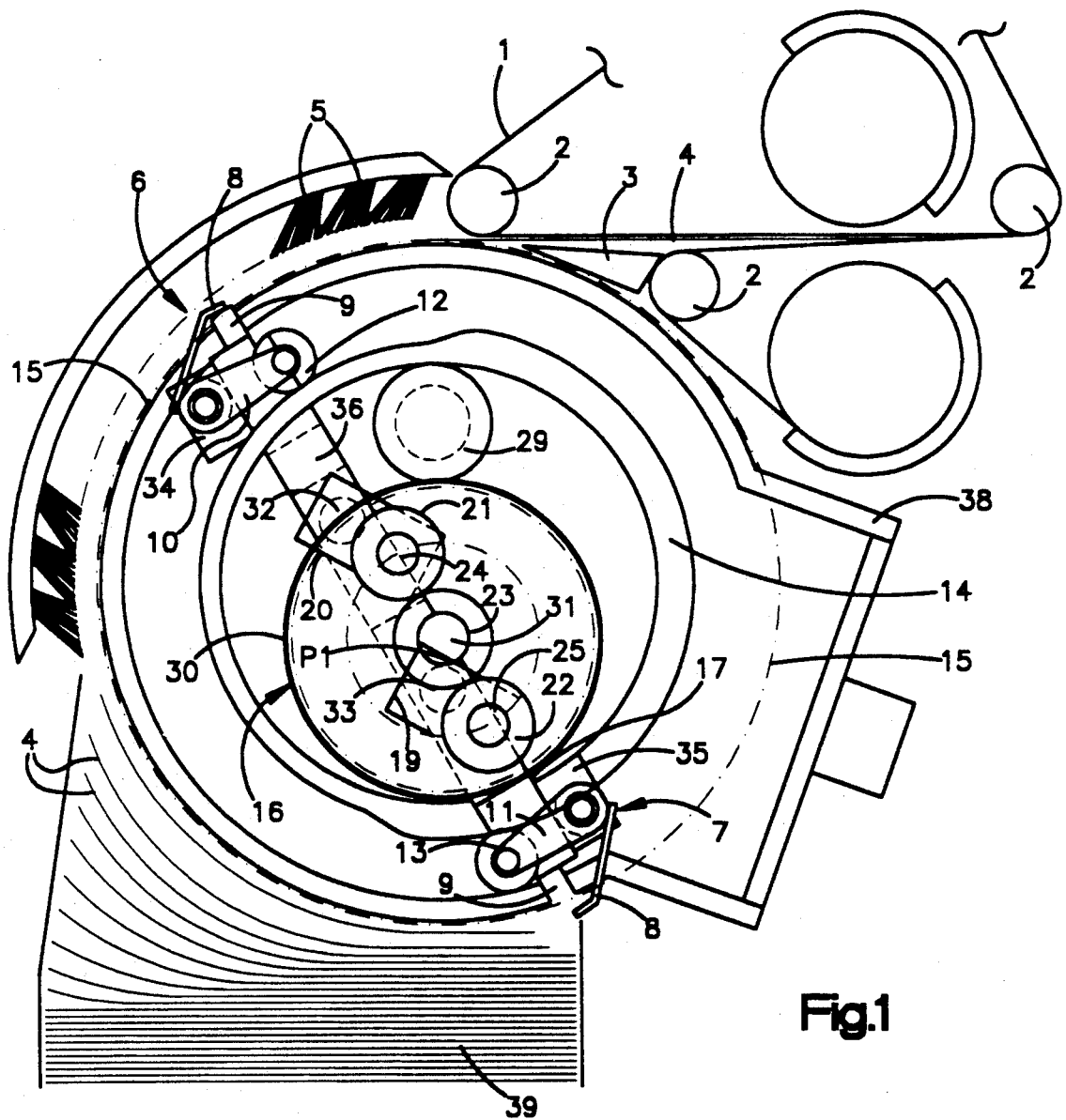
FIG. 1 is a side view of a deceleration device having cam-controlled gripper bars and an eccentric drive.

As illustrated in FIG. 1 a conveyor belt 1 driven by conveyor belt rollers 2 conveys folded products 4, via a wedge 3, into a deceleration device provided in the folder. The wedge 3 accurately guides the folded products 4 into the deceleration device. Thereafter the folded products 4 are gripped by transport devices 6, 7 and are additionally guided by brushes 5.

As illustrated in FIG. 1, the transport devices 6, 7 may be designed as grippers, which permits reliable gripping of the folded products 4 at high speeds. Several grippers arranged on gripper bars 34, 35 counteract the opening up of multi-page folded products 4 the open sides of which are conveyed in conveying direction. The grippers consist of gripper fingers 8 and gripper pads 9. Control levers 10, 11 each comprises a respective cam follower 12, 13, and are connected with the respective gripper bars 34, 35 on which the gripper fingers 8 are secured so as to be adjacent to each other. The cam followers 12, 13, in turn, roll on a control cam 14 which is fastened to a side wall 28. The control cam 14 effects the opening and closing of the transport devices 6, 7.

Planetary gearing 16 rotatably drives a drive bracket 17. An opposite drive bracket 18 is (FIG. 2) connected to the drive bracket 17 by cross members 36, 37 to rotate with the drive bracket 17. Gears provided at the side wall 28 support the drive bracket 18. Two pivot-mounted levers 19, 20 rotatably drive the drive bracket 17. Via two pins 32, 33 the pivot-mounted levers 19, 20 are movably connected to the drive bracket 17. Both pivot-mounted levers 19, 20 are rigidly connected to two planetary gears 21, 22 which rotate about a stationary sun gear 23. Via rotatably mounted stub shafts 24, 25 the planetary gears 21, 22 are mounted in a drive gear 30 which has an axis 31 and which meshes with a drive pinion 29.

Figure 1A:
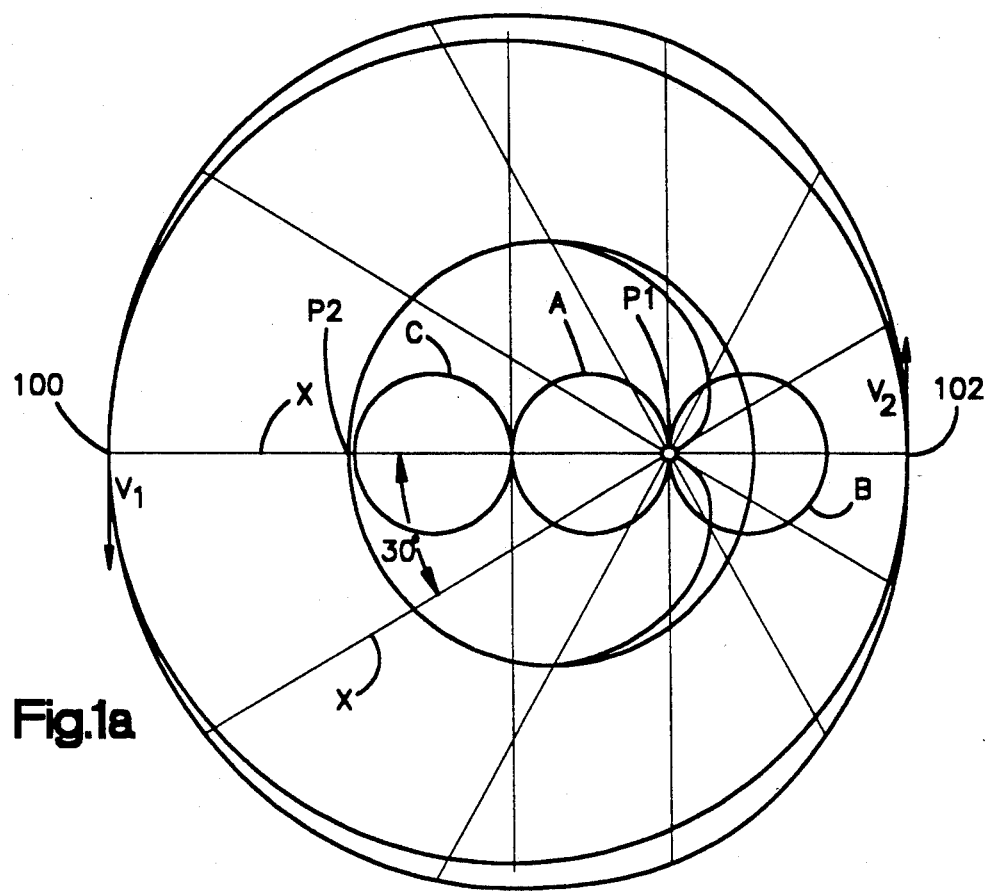
FIG. 1a shows a path of motion of a point on a cardioid.

FIG. 1a shows the path of motion of a point on a cardioid. With reference to this figure the principle of deceleration in accordance with the present invention is explained. The circle A corresponds to the fixed sun gear 23, and the circles B and C correspond to the rotating planetary gears 21, 22. The point P1 on the circle B traces a cardioid during rotation of the circle B around the fixed circle A. A connection between point P1 on the circle B and point P2 on the circle C through an imaginary rod X results in a suitable instrument for the deceleration of revolving transport devices.

When the rod X is moved by the planetary gears, the point P1 on the rod X traces a cardioid as shown in FIG. 1a, and the opposite ends 100, 102 of the rod X revolve around the circle A. The opposite ends 100, 102 of the rod X also experience translational movement caused by movement of the point P1 along a cardioid. When the opposite ends 100, 102 move through an arc of 30°, the end 100 traverses a distance greater than the distance traversed by the end 102. The velocity V1 of the end 100 is therefore greater than the velocity V2 of the end 102. Each opposite end 100, 102 thus decelerates during one half of its path of movement around the circle A, and then accelerates during the other half of its path of movement around the circle A.

In the embodiments of the invention disclosed herein, the drive brackets 17, 18 (FIG. 2) and 55 (FIG. 3) are respectively represented by the imaginary rod X. The opposite ends 100, 102 of the rod X represent the locations of the transport devices 6, 7. The transport devices 6, 7 thus decelerate and accelerate in accordance with the invention.

The revolution of the instantaneous centre P1 on the cardioid, indicated by increments of 30°, shows that there is a great distance between point P1 and the path of motion after the take-over of the folded products and their subsequent deceleration. At the same time the opposite transport device is again accelerated and the distance to the path of motion reduced until the following folded products can be gripped.

Thus the deceleration is achieved by utilizing the speed behavior of a point which describes a cardioid.

Figure 2:
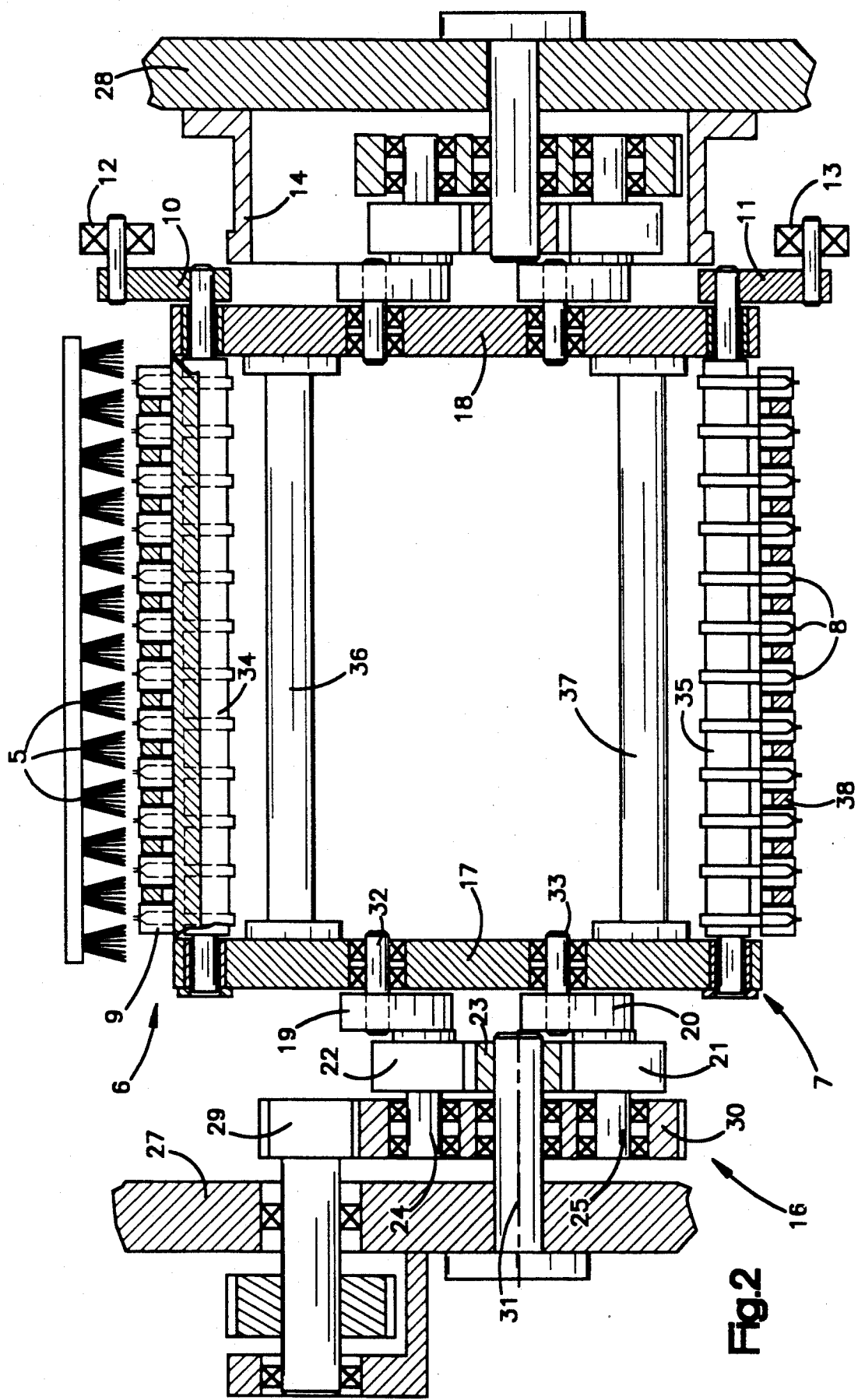
FIG. 2 is a longitudinal cut through a deceleration device.

As shown in FIG. 2, the drive bracket 17 is mounted on pins 32, 33 as well as on pivot-mounted levers 19, 20. The rotation of the planetary gears 21, 22, caused by the rotation of the drive gear 30 around the fixed sun gear 23, results in rotation of the pivot-mounted levers 19, 20 around the respective centre of the stub shafts 24, 25, as shown in FIG. 1. Thus the pivot-mounted levers 19, 20 effect a rotary motion relative to the rotation of the drive gear 30.

As can be seen in FIG. 1, the transport device 6 features a great distance from point P1 after having gripped a folded product 4, whereas the transport device 7 has just released a folded product 4 to be deposited onto the stack 39. The distance between the point P1 and the path of motion 15 is minimal at the moment of release of the folded products 4 so that likewise the velocity of the folded products 4 reaches its minimum. After release of the folded products 4 the speed of the transport devices 6, 7 increases again.

Figure 3:
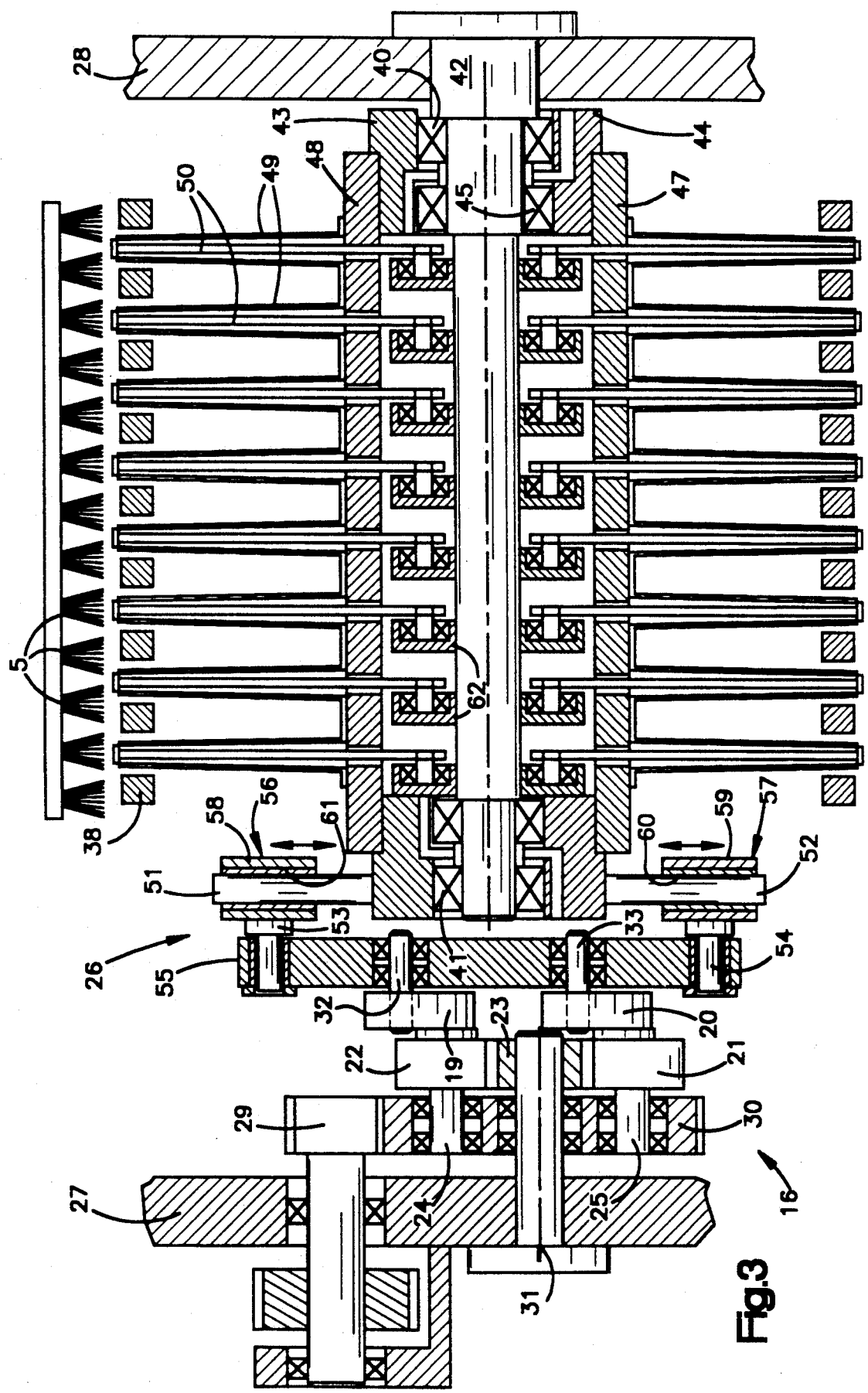
FIG. 3 is a cut through a deceleration device which is driven by a drive gear/crank mechanism combination having gripper rods.

An alternate embodiment of a deceleration device in accordance with the present invention is shown in FIG. 3. The device is driven by a gear drive/crank mechanism combination having gripper rods.

The left part of FIG. 3 shows a planetary gearing 16 which is secured in a side wall 27 on a shaft having an axis 31. A cantilevered shaft 42 is mounted in the right side wall 28. A support segment 43 is rotatably connected to the cantilevered shaft 42 by roller bearings 40, 41. Opposite the support segment 43 there is arranged another support segment 44 which is rotatably arranged on the cantilevered shaft 42 by roller bearings 45, 46. Thus the support segments 43, 44 can be moved on the cantilevered shaft 42 independently of each other.

Gripper supports 47, 48 which receive gripper rods 50 in long bushings 49 are secured on the support segments 43, 44. The gripper supports 47 48 are fastened on the outer circumference of the support segments 43, 44.

Guiding rods 51, 52 are mounted on the support segments 43, 44 and are movable into positions opposite each other when the support segments 43, 44 are moved. This effected by pins 53, 54 which are rotatably mounted in the drive bracket 55. As with the drive bracket 17 described above, the drive bracket 55 is moved via pins 32, 33 and pivot-mounted levers 19, 20 such that a point on the drive bracket 55 traces a cardioid, and the opposite ends of the drive bracket 55 revolve around the axis 31 of the drive gear 30. The opposite ends of the drive bracket 55 experience translational movement caused by movement of the point along a cardioid, and also experience acceleration and deceleration throughout their paths of movement around the axis 31. The pins 53, 54 supported on the ends of the drive bracket 55 experience the same movements. Because the pins 53, 54 experience translational movement, the distance between the axes of the pins 53, 54 and the axis of the cantilevered shaft 42 changes depending on the respective angle of rotation of the drive bracket 55. Gliding guides 56, 57 are supported on the pins 53, 54 to move with the pins 53, 54. The gliding guides 56, 57 comprise bushings 58, 59 and sleeves 60, 61 within the bushings 58, 59. The sleeves 60, 61 slide on the guiding rods 51, 52 to permit rotational movement of the guiding rods 51, 52 about the shaft 42 relative to each other. The different distances resulting from the rotation of the pivot-mounted levers 19, 20 around the respective centre of the stub shafts 24, 25 effect a change in speed of the support segments 47, 48 in the circumferential direction along the deceleration path 15a and the acceleration path 15b given a constant velocity of the drive gear 30. However, the translational movements of the bracket 55 are taken up by sliding movement of the sleeves 60, 61 on the guiding rods 51, 52. Absent translational movement, the revolving transport devices 6, 7 move more smoothly, and the inertia of the moving parts of the deceleration device imparts less and fewer disruptive forces to the device.

Figure 4:
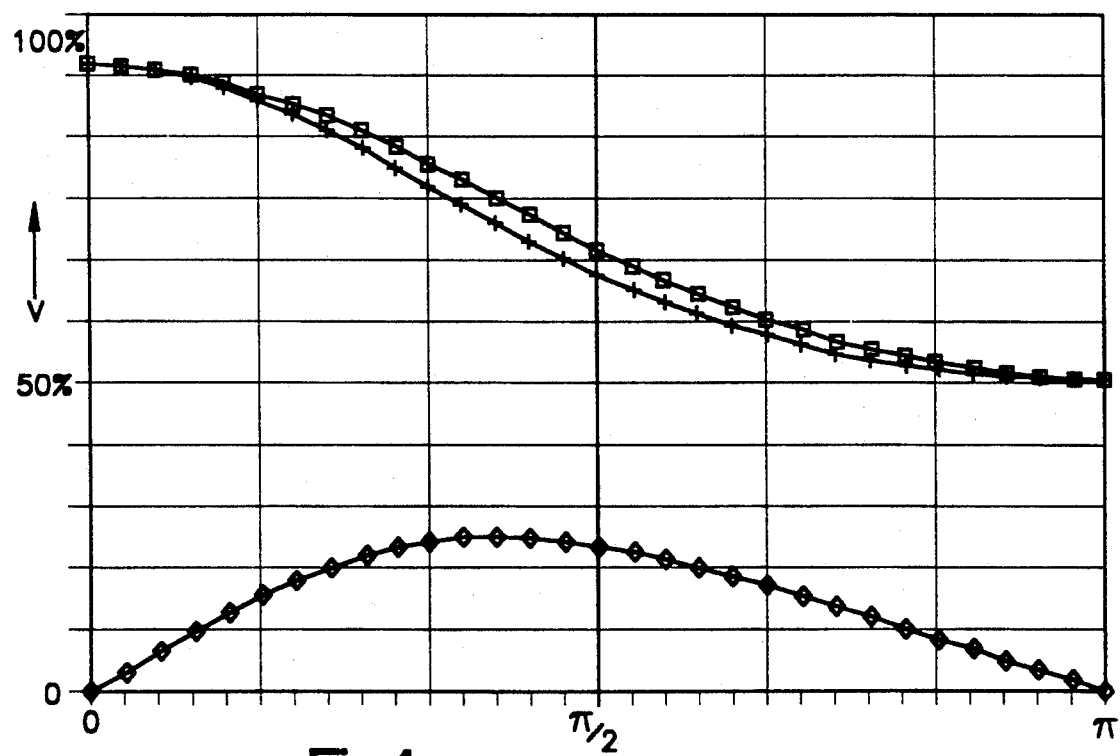
FIG. 4 is a velocity graph of the folded products, the x-axis representing the angle of rotation of the deceleration device.

Due to the lack of high frequencies, the translatory motion of the pins 53, 54 is not critical because the pins 53, 54 perform only a compensating motion. In this embodiment the motion of the gripper rods 50 is effected by control cams 62 which are provided in the interior of the cylinder and which open and close the gripper fingers 7 in time to release and grip the folded products being conveyed in the printing press FIG. 4 is a velocity graph of the folded products, the x-axis representing the angle of rotation of the deceleration device. The lower part of the graph shows the velocity of the deceleration device. The two curves in the upper part of FIG. 4 show that the velocity of the folded products can be reduced by more than 50% by means of the deceleration device. Said curves represent two specimen embodiments of the deceleration device. It can be recognized that the achievable deceleration of the folded products is about the same in both specimen embodiments.

FIG. 1 shows a deceleration device which is driven by planetary gearing. The advantages of this embodiment are the reliable transport of folded products by means of gripper bars 34, 35, and the continuous deceleration of the folded products 4. With this embodiment of the invention there is only one rotary motion.

FIG. 3 shows a deceleration device which is driven by a planetary gearing/crank mechanism combination. This has the advantages that grippers ensure a reliable paper transport and that the folded products are decelerated continuously. In addition, due to the light gripper system the forces of inertia are small at high speeds. Moreover, the transport devices describe a circular path on which the gripper angle remains the same.

The invention can be used in pinless former folders, high-speed folders and combination folders.

The embodiments described above are to be considered as preferred embodiments of the invention which do not limit the scope of the invention.

Having described the invention, the following is claimed:

1. An apparatus for decelerating sheet products being conveyed, said apparatus comprising:
    a first transport device (6) having means for gripping and releasing sheet products;
    a second transport device (7) having means for gripping and releasing sheet products;
    a bracket (17, 18 or 55) having a first end portion and a second end portion;
    gear means (16) for moving said bracket about an axis (31) so that a point (P1) on said bracket (17, 18 or 55) traces a cardioid around said axis (31) and said end portions of said bracket (17, 18 or 55) move translationally relative to said axis (31) so that each end portion of said bracket (17, 18 or 55) decelerates during one half of its path of movement around said axis (31) and accelerates during the other half of its path of movement around said axis (31); and
    means for connecting said first transport device (6) to said first end portion of said racket (17, 18 or 55) for said first transport device (6) to decelerate and accelerate around said axis (31) with said first end portion, and for connecting said second transport device (7) to said second transport device (7) to decelerate and accelerates around said axis (31) with said second end portion.

2. An apparatus as defined in claim 1 wherein said gear means (16) comprises a sun gear (23) centered on said axis (31) and a pair of planetary gears (21, 22) which revolve around said sun gear (23), said bracket (17, 18 or 55) having a center between said end portions and being connected to said planetary gears (21, 22) to be eccentric relative to said sun gear (23).

3. An apparatus as defined in claim 1 wherein said connecting means includes means for taking up said translational movement of said end portions of said bracket (55) so that said transport devices (6, 7) each revolve around said axis (31) in a circular path.

4. An apparatus as defined in claim 3 wherein said gear mean (16) comprises a sun gear (23) centered on said axis (31) and a pair of planetary gears (21, 22) which revolve around said sun gear (23), said bracket having a center between said end portions and being connected to said planetary gears (21, 22) to be eccentric relative to said sun gear (23).

5. An apparatus for decelerating sheet products being conveyed, said apparatus comprising:
    a first transport device (6) having means (6-13) for gripping and releasing sheet products;
    a second transport device (7) having means (6-13) for gripping and releasing sheet products;

revolving means (16) for revolving said first and second transport devices (6, 7) about an axis (31), said revolving means (16) including:
  gear means (19-23) having a pin ($P_1$) movable along a cardioid around said axis (31) with a velocity that increases and decreases as said point ($P_1$) traverses said cardioid; and
  drive means (17, 18, 32, 33) drivingly connecting said first and second transport devices (6, 7) with said gear means (19, 20), said drive means (17, 18, 32, 33) decelerating said first transport device (6) and simultaneously accelerating said second transport device (7) in response to acceleration of said point ($P_1$), and accelerating said first transport device (6) and simultaneously decelerating said second transport (7) device in response to deceleration of said point ($P_1$).

6. An apparatus as defined in claim 5 wherein said first and second transport devices (6, 7) are fixed relative to each other by said drive means (17, 18, 32, 33), said revolving means (16) moving said first and second transport devices (6, 7) translationally relative to said axis (31) when revolving said first and second transport devices (6, 7) about said axis (31).

* * * * *

UNITED STATES PATENT AND TRADEMARK OFFICE
CERTIFICATE OF CORRECTION

PATENT NO. : 5,141,221
DATED : August 25, 1992
INVENTOR(S) : Richard B. Mack and Roger R. Belanger It is certified that error appears in the above-identified patent and that said Letters Patent is hereby corrected as shown below:

Column 6, Line 37, Claim 1, change "racket" to -- bracket--.

Column 6, Line 41, Claim 1, delete"transport device (7) to" and insert --end portion of said bracket (17, 18 or 55) for said second transport device (7) to--.

Column 6, Line 42, Claim 1, change "accelerates" to --accelerate--.

Column 6, Line 65, Claim 5, change "(6-13) to --(8-13)--.

Column 6, Line 68, Claim 5, after "products" insert --and--.

Signed and Sealed this

Twelfth Day of October, 1993

Attest:

BRUCE LEHMAN

*Attesting Officer*    *Commissioner of Patents and Trademarks*